US006950321B2

(12) United States Patent
Stancu et al.

(10) Patent No.: US 6,950,321 B2
(45) Date of Patent: Sep. 27, 2005

(54) ACTIVE DAMPING CONTROL FOR L-C OUTPUT FILTERS IN THREE PHASE FOUR-LEG INVERTERS

(75) Inventors: Constantin C. Stancu, Anaheim, CA (US); Silva Hiti, Redondo Beach, CA (US)

(73) Assignee: General Motors Corporation, Detroit, MI (US)

( * ) Notice: Subject to any disclaimer, the term of this patent is extended or adjusted under 35 U.S.C. 154(b) by 144 days.

(21) Appl. No.: 10/669,618

(22) Filed: Sep. 24, 2003

(65) Prior Publication Data

US 2005/0063202 A1 Mar. 24, 2005

(51) Int. Cl.[7] .................................................. H02M 1/12
(52) U.S. Cl. ............................................ 363/40; 363/98
(58) Field of Search .............................. 363/40, 95, 98

(56) References Cited

U.S. PATENT DOCUMENTS

| | | | | | |
|---|---|---|---|---|---|
| 5,148,362 | A | * | 9/1992 | Braun et al. | 363/95 |
| 5,351,178 | A | * | 9/1994 | Brennen et al. | 363/40 |
| 5,488,286 | A | * | 1/1996 | Rozman et al. | 322/10 |
| 5,502,360 | A | * | 3/1996 | Kerkman et al. | 318/805 |
| 5,909,366 | A | * | 6/1999 | Sanada | 363/98 |
| 6,307,759 | B1 | * | 10/2001 | Inarida et al. | 363/37 |
| 6,630,809 | B2 | * | 10/2003 | Chen et al. | 318/804 |
| 6,768,284 | B2 | * | 7/2004 | Lee et al. | 318/808 |
| 6,809,496 | B2 | * | 10/2004 | Anghel et al. | 318/700 |
| 6,861,897 | B1 | * | 3/2005 | Cheng et al. | 327/552 |

OTHER PUBLICATIONS

R.A. Gannett, Application of Synchronous and Stationary Frame Controllers for Unbalanced and Non–Linear Load Compensation in 4–Leg Inverters, May 2002.
Michael J. Ryan, Decoupled Control of a Four–Leg Inverter via a New 4×4 Transmission Matrix, IEEE Transactions on Power Electronics, vol. 16, No. 5, Sep. 2001.
Krause et al., Analysis of Electric Machinery Sep. 2003.
Richard Zhang, A Three–Phase Inverter with A Neutral Leg with Space Vector Modulation, Feb. 1997, pp. 857–863.

* cited by examiner

*Primary Examiner*—Jeffrey Sterrett
(74) *Attorney, Agent, or Firm*—Christopher DeVries

(57) ABSTRACT

Methods and apparatus are provided for controlling an inverter with an under-damped L-C filter connected to a load. Samples of the inverter output are processed to generate voltage regulation signals and damping signals. The voltage regulation signals include both regulating and imbalance compensating elements, and are further modified by the damping signals. The modified voltage regulation signals control the switching circuits of the inverter to stabilize the inverter output to the load.

16 Claims, 4 Drawing Sheets

ACTIVE DAMPING CONTROL FOR L-C OUTPUT FILTERS IN THREE PHASE FOUR-LEG INVERTERS

TECHNICAL FIELD

The present invention generally relates to three-phase voltage source inverters, and more particularly relates to the damping control of the L-C output filters in three-phase four-leg voltage source inverters.

BACKGROUND

Three-phase voltage source inverters (VSI's) are generally used to convert DC power into three-phase AC power. Typically, the three-phase output voltages are sinusoidal waveforms spaced 120 degrees apart, to be compatible with a wide variety of applications requiring conventional AC power. In general, the output power frequencies commonly used are 50, 60, and 400 hertz, but other frequencies could be used as well. One current example of an inverter application is the electric or hybrid automobile, where a DC power source, such as a battery, fuel cell array, or other equivalent device, is converted into an AC power supply for various internal control functions, including the propulsion system.

The quality of an inverter is generally determined by its output voltage and frequency stability, and by the total harmonic distortion of its output waveforms. In addition, a high quality inverter should maintain its output stability in the presence of load current variations and load imbalances.

In the case of unbalanced loads, the 4-leg three-phase inverter topology is generally considered to offer superior performance than a 3-leg three-phase topology. That is, with an unbalanced load, the 3-phase output currents from an inverter will generally not add up to zero, as they would in a 3-leg balanced load situation. Therefore, a fourth (neutral) leg is typically added to accommodate the imbalance in current flow caused by an unbalanced load. If a neutral is not used with an unbalanced load, voltage imbalances may occur at the load terminals, and the output power quality may be adversely affected.

The operational functions of a typical inverter are generally controlled by drive signals from an automatic controller. The controller and inverter are usually implemented as a closed loop control system, with the inverter output being sampled to provide regulating feedback signals to the controller. The feedback signals typically include samples of the output voltage and current signals, and can also include harmonics of the fundamental output frequency.

The output frequency harmonics are usually suppressed by a 3-phase inductor-capacitor (L-C) filter, which is normally connected at the output of the inverter. However, a typical L-C filter has very low component resistance, and may exhibit under-damped behavior. This behavior can lead to filter oscillations as a result of sudden changes in the inverter load, and can create distortion or over-voltages on the load. Moreover, the typical voltage control loop response of an inverter controller may be inadequate to compensate for this type of L-C filter oscillation.

One method of mitigating the oscillation tendency of an under-damped L-C filter is to add damping resistors in the filter circuit. However, resistive damping will generally have a degrading effect on inverter efficiency, and can also complicate the thermal management of the inverter.

Accordingly, it is desirable to provide an inverter controller with a damping control scheme that will reduce the tendency of the L-C output filter to oscillate without degrading the efficiency of the inverter. In addition, it is desirable to provide an inverter controller with a damping scheme that will also improve the transient performance of the inverter. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, methods and devices are provided for controlling a multi-phase inverter having an under-damped L-C filter connected to a load. In one exemplary method, the inverter output is sampled to generate feedback voltage and current signals. These signals are processed to generate voltage regulation signals and damping signals. The voltage regulation signals comprise regulating and imbalance compensating elements, and are further modified by damping signals. The modified voltage regulation signals are processed into control signals for the inverter to stabilize the inverter output to the load.

An exemplary embodiment of a device is provided for controlling a multi-phase inverter having an under-damped L-C filter connected to a load. The device includes means for sampling the multi-phase inverter output and for generating damping correction signals. The multi-phase output is also processed through a converter, which transforms the multi-phase output into d-axis, q-axis and zero-axis voltage and current elements. These elements are processed in corresponding regulators to generate voltage regulation signals, each of which comprises a compensating fundamental component and a compensating imbalance component.

The zero-axis voltage regulation signal is modified by an active damping filter, and the d-axis, q-axis and zero-axis voltage regulation signals are combined with the corresponding damping correction signals in a drive controller. The drive controller processes the corrected voltage regulating signals into control inputs for the inverter switching circuits, which enable the inverter to damp the L-C filter and to regulate the fundamental and imbalance characteristics of the multi-phase output.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention pertain to the area of voltage source inverters operating in a standalone mode. Generally, this type of inverter is used to convert DC power available at a selected voltage into AC power with fixed voltage and frequency. Ideally, the output voltage and frequency stability of an inverter should be independent of load variations and imbalances. To provide this type of stabilization, an inverter controller may be used in a closed loop feedback configuration to provide regulating and imbalance compensating signals to the inverter. The inverter controller may be implemented in hardware or software, or any combination of the two.

As previously noted in the Background section, the four-leg inverter topology is generally used for quality AC power generation into a three-phase unbalanced load application. The fourth leg provides a return path for the neutral imbalance current of a three-phase load.

A three-leg inverter configuration typically connects the load neutral to the mid-point of two series-connected capacitors across the DC voltage source. In this configuration, the AC output voltage would be approximately 0.5 Vdc, whereas the four-leg configuration provides an AC output voltage of approximately 0.578 Vdc. A further advantage of the four-leg configuration is that a smaller, single capacitor can be used instead of the two required for the three-leg approach.

Figure 1:
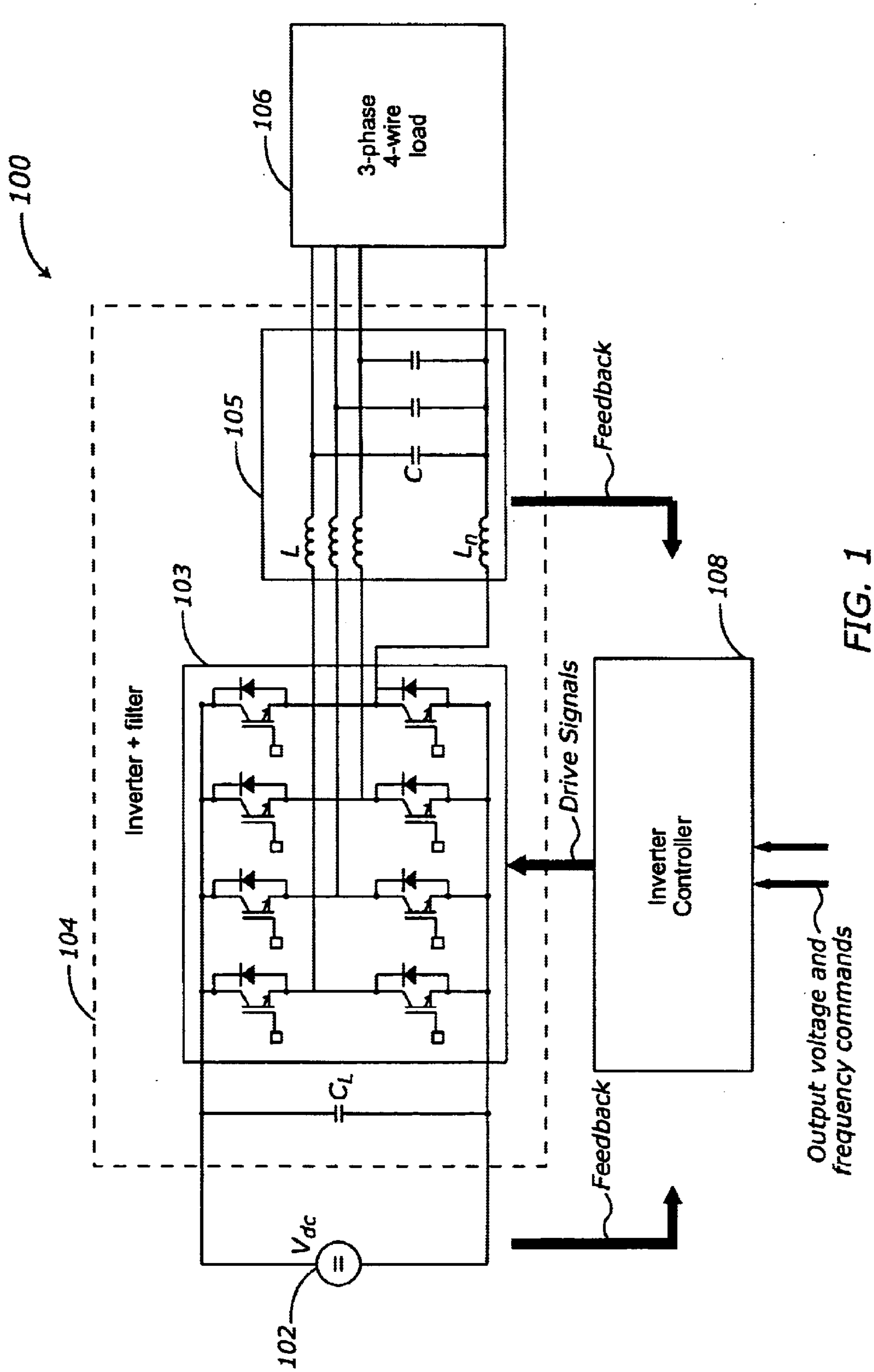
FIG. 1 is a block diagram of an exemplary four-leg three-phase inverter system.

According to an exemplary embodiment of a four-leg three-phase inverter system 100, shown in FIG. 1, a DC voltage source 102 supplies a selected level of voltage (Vdc) to an inverter/filter 104 connected to a three-phase four-wire load 106. Inverter/filter 104 typically comprises an input (link) capacitor $C_L$ connected across source 102, and in parallel with four sets of switching circuits 103, which generate a three-phase output signal via L-C filter 105 to the load 106. Inductor $L_n$ represents the inductance of the neutral line.

An inverter controller 108 is typically configured to receive voltage and frequency command signals from a control unit (not shown in FIG. 1), and to also receive feedback signals from the input Vdc and from the outputs of inverter/filter 104 at the inputs to load 106. Inverter controller 108 processes the command and feedback signals to create output drive signals for the inverter/filter 104 switching circuits 103. The inverter controller 108 output drive signals typically include voltage and current regulating elements, and may also include load imbalance and filter under-damping compensation elements.

Figure 2:
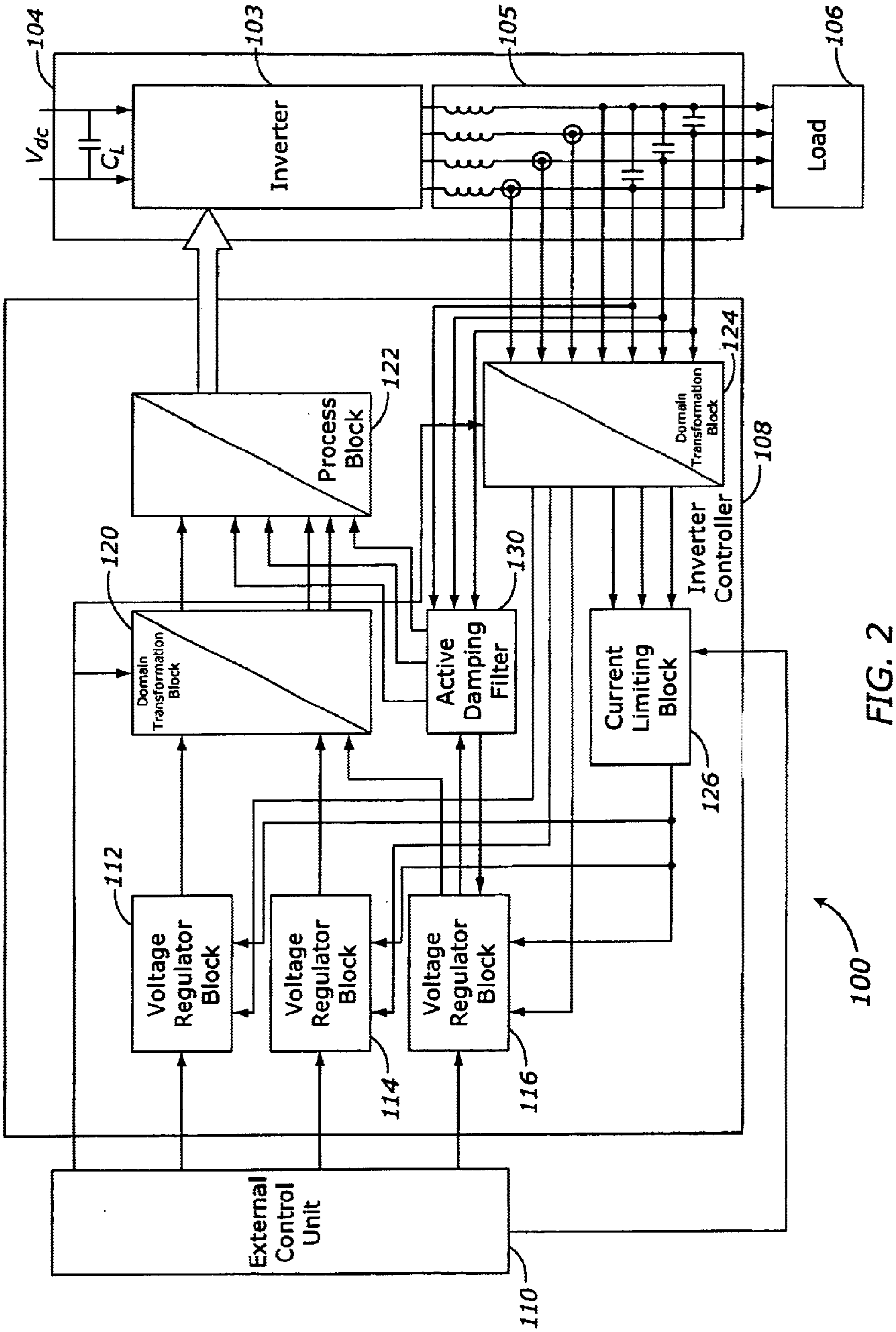
FIG. 2 is a simplified block diagram of an exemplary inverter controller with active damping.

FIG. 2 depicts a simplified block diagram of inverter controller 108 within the closed loop four-leg three-phase inverter system 100. In this embodiment, an external control unit 110 typically provides reference signals, such as voltage, current, frequency, etc., to inverter controller 108 to establish the desired output voltage and frequency values of inverter/filter 104. In an alternate embodiment, control unit 110 could be integrated within inverter controller 108.

Voltage regulator blocks 112, 114, 116 receive voltage reference signals from control unit 110 while a current limiting block 126 receives a current reference signal from control unit 110. Samples of the voltage and current outputs from L-C filter 105 are transformed from the AC domain to the DC domain in block 124, which receives a frequency reference signal from control unit 110. Voltage feedback signals from block 124 are fed to corresponding voltage regulator blocks 112, 114, 116, and current feedback signals from block 124 are fed to current limiting block 126. A current limiting signal from block 126 is applied to voltage regulator blocks 112, 114, 116.

Voltage regulating blocks 112, 114, 116 generate regulating signal outputs that are limited by the output of current limiting block 126. The regulating signal outputs are inverse transformed from the DC domain to the AC domain in block 120, which receives a frequency reference signal from control unit 110. The transformed regulating signals are then processed by block 122 into driving signals for the inverter 104 switching circuits 103.

Concurrently, samples of the voltage outputs from L-C filter 105 are also connected to an active damping filter 130, which processes the voltage samples into voltage correction signals. The voltage correction signals are used as a damping influence on the driving signals generated by block 122. In addition, active damping filter 130 provides a damping factor to voltage regulator block 116.

A more detailed description of the operation of inverter controller 108 is given below in conjunction with FIG. 3.

Figure 3:
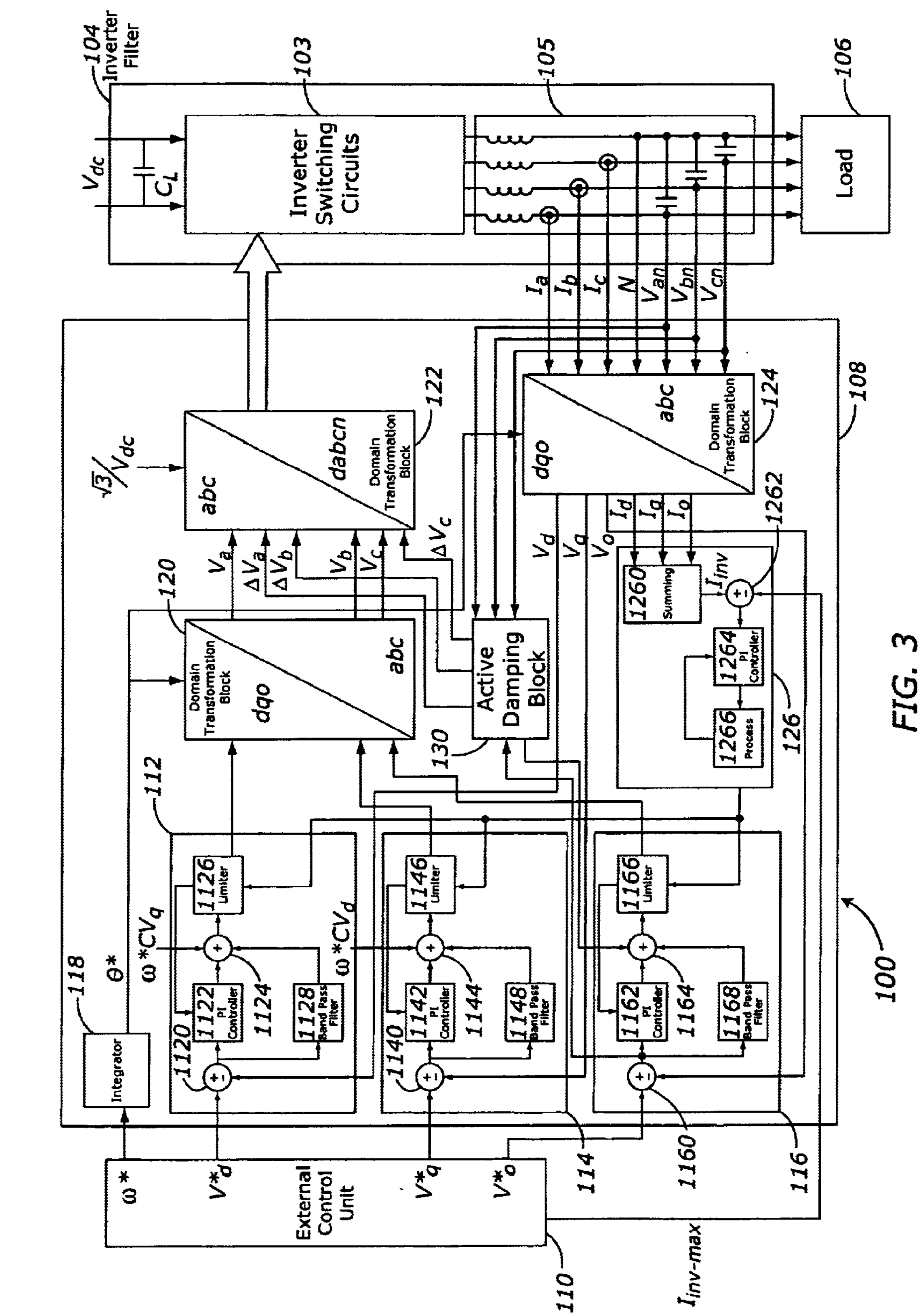
FIG. 3 is a detailed block diagram of an exemplary embodiment of an inverter controller with active damping.

An exemplary embodiment of an inverter controller 108 for a four-leg three-phase inverter/filter 104 is shown in a more detailed block diagram form in FIG. 3. In this embodiment, the block functions within inverter controller 108 are implemented in software modules to constitute a control algorithm for inverter/filter 104.

This approach utilizes the Park transformation, as is known in the electrical machine art (see "Analysis of Electric Machinery" by Krause, Paul C., Wasynczuk, Oleg and Sudhoff, Scott D.; IEEE Press, 1995, Institute of Electrical and Electronics Engineers, Inc.), to convert the sampled output signals from an AC domain to a DC domain in order to simplify the mathematical processes implemented within inverter controller 108. An inverse Park transformation is then used to convert the processed DC domain signals back to the AC domain for the control inputs to the inverter switching circuits 103. Other techniques for converting from the AC domain to the DC domain could be used in a wide array of equivalent embodiments.

The basic concept of the Park transformation is known as the synchronous reference frame approach. That is, a rotating reference frame is utilized in order to make the fundamental frequency quantities appear as DC values. A common convention is to label the AC domain (stationary reference frame) quantities, such as phase voltages and currents, as "abc", and to label the corresponding Park-transformed DC domain (synchronous reference frame) quantities as "dq0". This labeling convention will be followed throughout the following discussion.

According to the exemplary embodiment shown in FIG. 3, controller 108 is configured to process regulating signals that control the input signals to the switching circuits 103 of inverter 104. These regulating signals are typically derived from reference signals and feedback signals, and can be processed in controller 108 to provide composite voltage regulating and imbalance compensation signals to drive switching circuits 103. In addition, the disclosed exemplary embodiment also provides active damping for L-C filter 105, in conjunction with the composite voltage regulating and imbalance compensation signals.

As previously noted in the Background section, inverter L-C filters may be susceptible to oscillation under certain types of load transients. For example, in an exemplary embodiment of an inverter L-C filter, the cut-off frequency is usually in excess of 1 kHz, in order to minimize the size and weight of the filter components. Typical values might be 100 $\mu$H for the filter inductance and 223 $\mu$F for the filter capacitance. This combination of component values would result in a cut-off frequency of $f_f$=1568 Hz, based on the relationship $f_f=\omega_f/2\pi=1/(2\pi\sqrt{LC})$. An under-damped L-C filter oscillation at this frequency would usually be out of the regulation bandwidth of an inverter controller, and would probably not be eliminated through typical regulating actions. As will be described below, the exemplary embodiment includes an active damping control to reduce the oscillation susceptibility of an L-C filter.

Referring now to FIG. 3, reference values for voltage, current and frequency are generally determined within a control unit 110 to establish desired values of inverter output voltage and frequency within a maximum current limit. The voltage references are $V^*_d$, $V^*_q$, $V^*_0$, which are typically calculated Park transformations of predetermined reference three-phase voltage values. The maximum current limit value is shown in FIG. 3 as $I_{inv\_max}$, and the reference frequency is represented as $\omega^*$.

The inverter/filter 104 three-phase output voltages and currents may be measured by any conventional method to create feedback signals to inverter controller 108. The voltage feedback signals are typically measured between phase and neutral, and are designated herein as $V_a$n, $V_{bn}$, $V_{cn}$. The current feedback signals can be measured by line sensors on each phase, and are designated herein as $I_a$, $I_b$, $I_c$.

Voltage feedback signals $V_{an}$, $V_{bn}$, $V_{cn}$ are inputted in parallel to transform block 124 and to active damping block 130. The operation of active damping block 130 will be described in a later section of this Detailed Description.

Voltage feedback signals $V_{an}$, $V_{bn}$, $V_{cn}$ are converted from AC domain to DC domain equivalents via the Park transformation in block 124. The reference angle used for this transformation is designated $\theta^*$, and is generated by an integrator block 23 from the reference signal $\omega^*$. The transformed voltage feedback signals are designated $V_d$, $V_q$, $V_0$ and are fed back to adders 1120, 1140 and 1160, respectively. The reference voltage signals $V^*_d$, $V^*_q$, $V^*_0$ are also inputted to adders 1120, 1140 and 1160, respectively, to generate voltage error signals ($V^*_d-V_d$, $V^*_q-V_q$, $V^*_0-V_0$) at the outputs of the respective adders 1120, 1140, 1160.

The voltage error signals $V^*_d-V_d$, $V^*_q-V_q$, $V^*_0-V_0$ are routed through proportional-integral (PI) controller blocks 1122, 1142, and 1162, respectively, for amplifying and smoothing. At the same time, voltage error signals $V^*_d-V_d$, $V^*_q-V_q$, $V^*_0-V_0$ are also routed through band pass filter blocks 1128, 1148, and 1168, respectively.

Referring now to the d-axis voltage regulator (112) in this embodiment, block 1128 is configured as a second order band pass filter with an adjustable gain. The center frequency of filter 1128 is set at twice the reference frequency $\omega^*$, in order to provide a high gain for the d-axis voltage controller at this particular frequency. This is intended to compensate for an unbalanced inverter output voltage condition, where a voltage component at twice the fundamental frequency appears in the voltage feedback signal. By placing band pass filter 1128 in a parallel path within the d-axis voltage controller 112, the loop gain can be increased at $2^*\omega^*$ without affecting the phase and gain margin of the system.

The output signals from blocks 1122 and 1128 are combined in adder 1124, along with a quantity $-\omega^*LI_q$. This latter quantity is a feed-forward term, which may be obtained from control unit 110 by transforming the steady-state equations of the filter 105 from the stationary reference frame to the synchronous reference frame. The feed-forward term $-\omega^*L_q$ is used in this embodiment to improve the transient response of the d-axis voltage regulator 112, and to reduce the cross-channel coupling between the d-axis and q-axis controllers (112 and 114). For the q-axis controller 114, the corresponding feed-forward term is $\omega^*LI_d$.

The q-axis voltage regulator 114 operates in essentially the same manner as the d-axis voltage regulator 112, except for the feed-forward term, as noted above.

The 0-axis voltage regulator 116 differs from the d-axis and q-axis regulators (112, 114) in that its associated band pass filter 1168 is tuned to $\omega^*$, rather than $2^*\omega^*$. This is due to the fact that an unbalanced output voltage condition will generally produce a fundamental frequency component on the 0-axis feedback signal. Also, there is generally no need for a feed-forward signal in the 0-axis channel.

Figure 4:
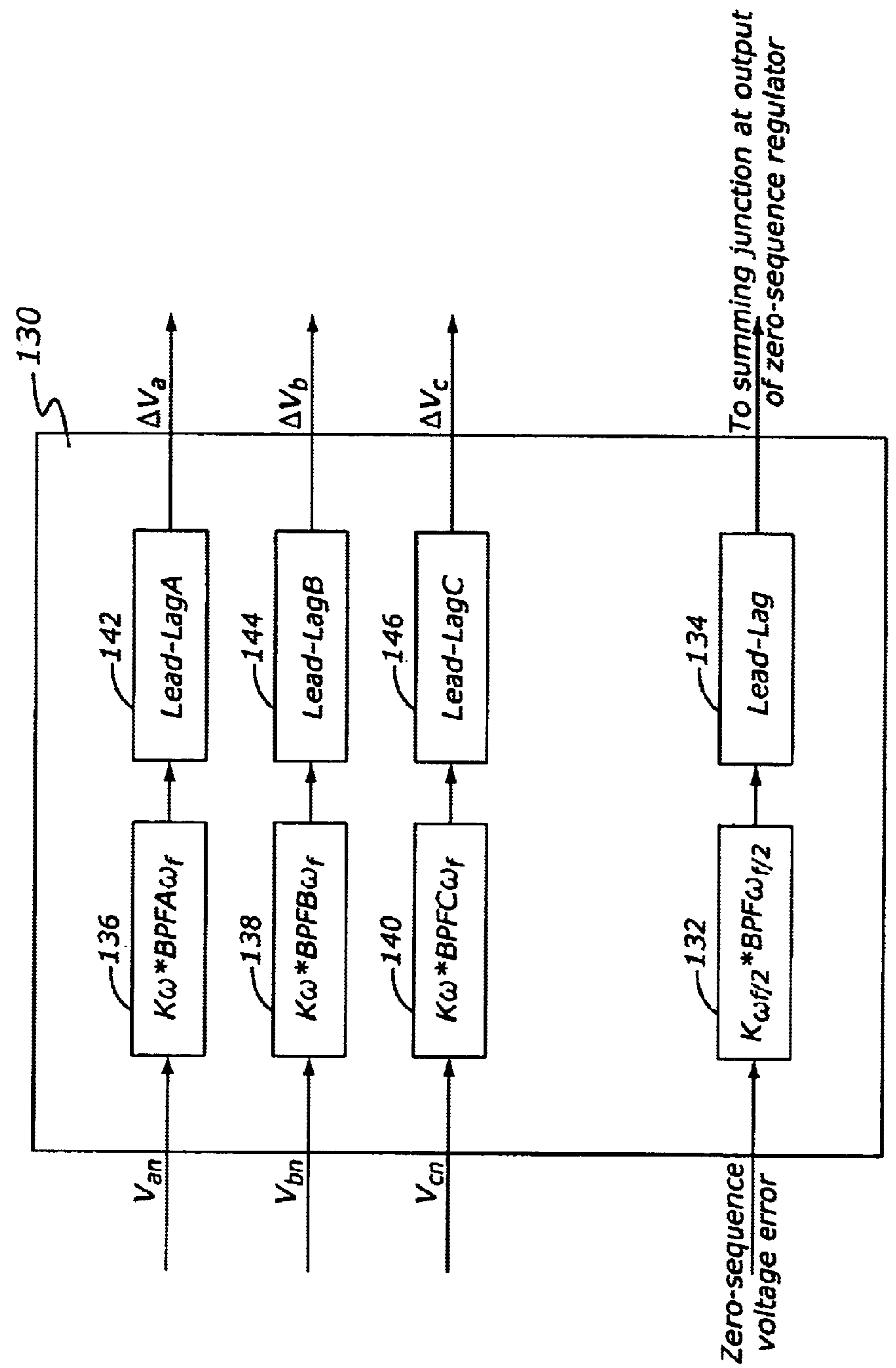
FIG. 4 is a block diagram of an exemplary embodiment of an active damping scheme.

Active damping block 130 also plays a role in the operation of 0-axis voltage regulator 116, as shown in FIGS. 3 and 4. The error voltage ($V^*_0-V_0$) generated at the output of adder 1160 is fed back to one channel of block 130, and is designated as the zero-sequence voltage error in FIG. 4. The zero-sequence voltage error is routed through a band pass filter 132, which is tuned to half the L-C output filter frequency ($\omega_f/2$). As a consequence of the four-leg inverter topology and the abc to dq0 transformation process, the equivalent inductance in the 0-axis voltage regulator 116 is typically four times larger than the equivalent inductance in the d-axis and q-axis voltage regulators (112, 114), assuming that the neutral leg inductance is equal to each phase inductance. As such, the inherent oscillation frequency is lower (½ in this example) in the 0-axis channel, and is generally within the regulating bandwidth capabilities of the inverter controller 108.

The output of band pass filter 132 is adjusted for timing delays in Lead-Lag block 134, and is fed back to the summing junction (adder 1164) to be combined with the 0-axis voltage regulation and imbalance compensating signals.

The outputs of adders 1124, 1144 and 1164 are routed through limiter blocks 1126, 1146, and 1166, respectively. Limiter blocks 1126, 1146, 1166 also receive a common input signal from current limiter 126, as will be described below. The limited output signals of blocks 1126, 1146, 1166 are then processed in block 120 from DC domain (dq0) to equivalent AC domain (abc) by means of an inverse Park transformation, using the reference angle $\theta^*$.

The regulating output signals from block 120 are designated $V_a$, $V_b$, $V_c$, and are combined with damping correction signals $\Delta V_a$, $\Delta V_b$, $\Delta V_c$ from active damping block 130. The damping correction signals are derived from voltage feedback signals $V_{an}$, $V_{bn}$, $V_{cn}$, as shown in FIGS. 3 and 4.

Feedback signals $V_{an}$, $V_{bn}$, $V_{cn}$ are each passed through respective band pass filters 136, 138, 140, tuned to the frequency of the L-C filter ($\omega_f$), and are then time-adjusted through respective Lead-Lag blocks 142, 144, 146. The resultant damping correction signals $\Delta V_a$, $\Delta V_b$, $\Delta V_c$ are outputted to block 122 to be combined with their respective regulating signals $V_a$, $V_b$, $V_c$, as noted above. In an exemplary embodiment, the damping correction signals $\Delta V_a$, $\Delta V_b$, $\Delta V_c$ are subtracted from the regulating signals $V_a$, $V_b$, $V_c$ to form damping corrected regulating signals within block 122.

The damping corrected regulating signals are normalized in block 122 by a multiplication factor ($\sqrt{3}/V_{dc}$), which is the inverse of the maximum achievable inverter phase output voltage for a given DC input voltage ($V_{dc}$). The normalized signals may be used to control the pulse train duty cycles of a conventional Pulse Width Modulator (PWM) within block 122, or through any other technique. The duty cycle modulated pulse trains, designated as $d_{abcn}$, are configured as the drive signals for the switching circuits 103 in inverter/filter 104. The switching devices in switching circuits 103, as depicted in FIG. 1, may be MOSFET's, IGBT's (Insulated Gate Bipolar Transistor), or any type of switching device with appropriate speed and power capabilities.

Referring now to the operation of current limiting block 126, current feedback signals $I_a$, $I_b$, $I_c$ are converted from AC domain to DC domain equivalents via the Park transformation in block 124. The transformed current feedback signals are designated $I_d$, $I_q$, $I_0$ and are fed into a summing block 1260 within current limiting block 126. The amplitude of inverter/filter 104 output current $I_{inv}$ is calculated in summing block 1260, based on the square root of the sum of the squares of the current feedback signals $I_d$, $I_q$, $I_0$. This calculated value ($I_{inv}$) is combined with the maximum current limit value $I_{inv\_max}$ in adder 1262 to form a difference signal ($I_{inv\_max}-I_{inv}$). This difference signal is then amplified and smoothed in a PI block 1264, so that the dynamics of the regulator are adequate for a fast reacting over-current protection. Block 1266 processes the output of block 1264 into a limiting factor, such as in the range of 0 to 1, where 1 corresponds to the maximum current limit. This limiting factor is then applied to the three limiting blocks 1126, 1146, 1166 as a multiplier, to add over-current protection to the voltage limiting function of blocks 1126, 1146, 1166.

It should be noted that the PI controllers (1122, 1142, 1162, 1264) in FIG. 3 each receive a feedback signal from their respective limiting modules (1126, 1146, 1166, 1266). This feedback scheme, known in the art as "integrator anti-wind-up", improves the transient behavior of the PI controllers.

The previously described drive signals from controller 108 to the switching circuits 103 provide the desired regulating and damping control for the multi-phase output of inverter/filter 104. As such, controller 108 and inverter/filter 104 constitute a closed-loop feedback system for maintaining the stability and quality of the inverter/filter 104 output.

In summary, the architecture of the inverter control algorithm, as disclosed in the exemplary embodiment of FIG. 3, provides a combination of voltage regulation, imbalance compensation, over-current protection, and L-C filter damping, with fast transient response, short execution time, high harmonic suppression and no degradation of inverter efficiency. Moreover, the inverter controller and the disclosed active damping feature can be implemented in software, with no additional current sensors required. In addition, verification tests have demonstrated that, with active damping as disclosed herein, typical inverter controller gains can be increased without incurring oscillation problems, even under no-load conditions.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of actively damping an L-C filter of an inverter having a plurality of control inputs and an alternating current multi-phase output, comprising the steps of:

feeding back the phase voltages of the alternating current multi-phase output through corresponding band-pass filters tuned to the natural frequency of the L-C filter to create corresponding filter correction voltages;

providing the filter correction voltages to corresponding regulating signals to modify the control inputs to the inverter;

transforming the feedback phase voltages from AC domain to DC domain equivalents, comprising a d-axis element, a q-axis element, and a zero-axis element;

generating a zero-sequence error signal based on the difference between the zero-axis element and a zero-axis reference signal;

passing the zero-sequence error signal through a band-pass filter tuned to one-half the natural frequency of the L-C filter to create a zero-sequence correction voltage; and providing the zero-sequence correction voltage to a zero-sequence regulator to further modify the control inputs of the inverter, wherein the modified control inputs to the inverter enable compensating regulation and damping of the fundamental and imbalance characteristics of the alternating current multi-phase output.

2. The method of claim 1 wherein the step of transforming the feedback phase voltages is implemented by a Park transformation.

3. The method of claim 1 wherein the filter correction voltages and the zero-sequence correction voltage are time-adjusted to compensate for regulating time delays.

4. An active damper for an L-C filter of an inverter having a plurality of control inputs and an alternating current multi-phase output, comprising:

band-pass filters tuned to the natural frequency of the L-C filter configured to receive corresponding feedback phase voltages from the alternating current multi-phase output, and to create corresponding filter correction voltages;

a drive controller configured to combine the filter correction voltages with corresponding regulating signals to modify the control inputs to the inverter;

a converter configured to transform the feedback phase voltages from AC domain to DC domain equivalents, comprising a d-axis element, a q-axis element, and a zero-axis element;

an adder configured to generate a zero-sequence error signal based on the difference between the zero-axis element and a zero-axis reference signal;

a zero-axis band-pass filter tuned to one-half the natural frequency of the L-C filter and configured to process the zero-sequence error signal to create a zero-sequence correction voltage; and a zero-sequence regulator configured to process the zero-sequence correction voltage to further modify the control inputs of the inverter, wherein the modified control inputs to the inverter enable compensating regulation and damping of the fundamental and imbalance characteristics of the alternating current multi-phase output.

5. The converter of claim 4 wherein the transforming of the feedback phase voltages is implemented by a Park transformation.

6. The active damper of claim 4 wherein the filter correction voltages and the zero-sequence correction voltage are time-adjusted to compensate for regulating time delays.

7. A method of controlling an inverter having an L-C filter and a plurality of control inputs, and having an alternating current multi-phase output, comprising the steps of:

converting the alternating current multi-phase output to a direct current equivalent, wherein the direct current equivalent comprises d-axis, q-axis and zero-axis voltage and current elements;

generating d-axis, q-axis and zero-axis error signals based on the differences between the d-axis, q-axis and zero-axis voltage elements and corresponding d-axis, q-axis and zero-axis voltage reference signals;

processing the d-axis, q-axis and zero-axis error signals to create d-axis, q-axis and zero-axis voltage regulating signals, wherein each of the voltage regulating signals comprises a fundamental compensating component combined with an imbalance compensating component;

concurrently passing the zero-axis error signal through a band-pass filter tuned to one-half the natural frequency of the L-C filter to create a zero-axis correction voltage;

modifying the zero-axis voltage regulating signal with the zero-axis correction voltage;

limiting the d-axis, q-axis and zero-axis voltage regulating signals with a current limiting factor derived from the d-axis, q-axis and zero-axis current elements;

converting the d-axis, q-axis and zero-axis voltage regulating signals to alternating current equivalents;

concurrently feeding back the phase voltages of the alternating current multi-phase output through corresponding band-pass filters tuned to the natural frequency of the L-C filter to create corresponding filter correction voltages;

combining the filter correction voltages with the corresponding alternating current equivalents of the voltage regulating signals to produce the plurality of control inputs to the inverter, wherein the plurality of control inputs to the inverter enable compensating regulation and damping of the fundamental and imbalance characteristics of the alternating current multi-phase output.

8. The method of claim 7 wherein the step of converting the inverter alternating current multi-phase output is implemented by a Park transformation.

9. The method of claim 7 wherein the step of converting the d-axis, q-axis and zero-axis voltage regulating signals is implemented by an inverse Park transformation.

10. The method of claim 7 wherein the filter correction voltages and the zero-axis correction voltage are time-adjusted to compensate for regulating time delays.

11. A controller for producing a plurality of control inputs to an inverter having an L-C filter and an alternating current multi-phase output, comprising:

a first converter configured to transform the alternating current multi-phase output to a direct current equivalent, wherein the direct current equivalent comprises d-axis, q-axis and zero-axis voltage and current elements;

a plurality of adders, configured to generate d-axis, q-axis and zero-axis error signals based on the differences between the d-axis, q-axis and zero-axis voltage elements and corresponding d-axis, q-axis and zero-axis voltage reference signals;

a plurality of regulators, configured to process the d-axis, q-axis and zero-axis error signals to create d-axis, q-axis and zero-axis voltage regulating signals, wherein each of the voltage regulating signals comprises a fundamental compensating component combined with an imbalance compensating component;

a band-pass filter tuned to one-half the natural frequency of the L-C filter configured to process the zero-axis error signal into a zero-axis correction voltage, wherein the zero-axis correction voltage modifies the zero-axis voltage regulating signal;

a plurality of limiters, configured to limit the d-axis, q-axis and zero-axis voltage regulating signals with a current limiting factor derived from the d-axis, q-axis and zero-axis current elements;

a second converter configured to inverse transform the d-axis, q-axis and zero-axis voltage regulating signals to alternating current equivalents;

a plurality of band-pass filters tuned to the natural frequency of the L-C filter, and configured to process the phase voltages of the alternating current multi-phase output to create corresponding filter correction voltages;

an inverter driver configured to combine the filter correction voltages with the corresponding alternating current equivalents of the voltage regulating signals to produce the plurality of control inputs to the inverter, wherein the plurality of control inputs to the inverter enable compensating regulation and damping of the fundamental and imbalance characteristics of the alternating current multi-phase output.

12. The controller of claim 11 further comprising:

a calculator configured to calculate a current amplitude based on the current elements;

an adder configured to subtract the current amplitude from a predetermined maximum current limit to produce a current difference signal; and a processor configured to generate a current limiting factor based on the current difference signal, wherein the current limiting factor is applied to each of the voltage regulating signals.

13. The controller of claim 11 wherein the first converter performs a Park transformation.

14. The controller of claim 11 wherein the second converter performs an inverse Park transformation.

15. An inverter system having an L-C filter and an alternating current multi-phase output, with a controller configured to supply control inputs to the inverter, comprising:

means for sampling the alternating current multi-phase output to generate damping correction signals;

means for transforming the alternating current multi-phase output into an equivalent direct current domain comprising d-axis, q-axis and zero-axis voltage and current elements;

means for processing the d-axis, q-axis and zero-axis voltage elements into corresponding d-axis, q-axis and zero-axis voltage regulating signals, each comprising a compensating fundamental component and a compensating imbalance component;

means for generating a current limiting factor from the d-axis, q-axis and zero-axis current elements;

means for limiting each of the d-axis, q-axis and zero-axis voltage regulating signals with the current limiting factor;

means for modifying the zero-axis voltage regulating signal with a damping factor;

means for inverse transforming the limited voltage regulating signals into an equivalent alternating current domain;

means for modifying the inverse transformed limited voltage regulating signals with the damping correction signals; and means for processing the modified voltage regulating signals into the control inputs for the inverter, wherein the control inputs enable the inverter to effect damping of the L-C filter and compensating regulation of the fundamental and imbalance characteristics of the alternating current multi-phase output.

16. The inverter system of claim 15 wherein the inverter is a 4-leg three-phase inverter.

* * * * *